United States Patent [19]
Ault et al.

[11] Patent Number: 6,085,217
[45] Date of Patent: Jul. 4, 2000

[54] METHOD AND APPARATUS FOR CONTROLLING THE ASSIGNMENT OF UNITS OF WORK TO A WORKLOAD ENCLAVE IN A CLIENT/SERVER SYSTEM

[75] Inventors: Donald F. Ault, Hyde Park; Jeffrey D. Aman, Poughkeepsie; Ernest S. Bender, Saugerties; Donna N. T. E. Dillenberger, Yorktown Heights; David B. Emmes, Poughkeepsie; Michael G. Spiegel, Monroe, all of N.Y.

[73] Assignee: International Business Machines Corporation, Armonk, N.Y.

[21] Appl. No.: 08/825,304

[22] Filed: Mar. 28, 1997

[51] Int. Cl.$^7$ .................................................. G06F 9/00
[52] U.S. Cl. ................................. 709/105; 709/100
[58] Field of Search .................................. 709/100, 102, 709/105, 104, 107

[56] References Cited

U.S. PATENT DOCUMENTS

| | | |
|---|---|---|
| 5,212,793 | 5/1993 | Donica et al. . |
| 5,249,290 | 9/1993 | Heizer . |
| 5,437,032 | 7/1995 | Wolf et al. . |
| 5,473,773 | 12/1995 | Aman et al. . |
| 5,504,894 | 4/1996 | Ferguson et al. . |
| 5,537,542 | 7/1996 | Eilert et al. . |
| 5,544,318 | 8/1996 | Schmitz et al. ............... 395/200.37 |
| 5,603,029 | 2/1997 | Aman et al. . |
| 5,752,031 | 5/1998 | Cutler et al. ......................... 395/673 |

FOREIGN PATENT DOCUMENTS

694837A1  7/1994  European Pat. Off. .

OTHER PUBLICATIONS

*MVS Planning: Workload Management*, IBM Publication GC28–1761–00, 1996.
*MVS Planning: Workload Management Services*, IBM Publication GC–28–1773–00, 1996.

"Optimal Control Of A Removable. . . With Finite Capacity", by, Wang et al., Microelectron. Reliab. (UK) vol. 35, No. 7, Jul. 1995, P1023–30.

"Providing Distributed Computing Environment Servers On Client Demand", IBM TDB, vol. 38, No. 3, Mar. 1995, P231–233.

"Queue–Dependent Servers", by V.P. Singh, IBM TR 221301, Jun. 30, 1971.

"Queue Dependent Servers Queueing System", by Garg et al., Micro–electron. Reliab. (UK) vol. 33, No. 15, Dec. 1993, P2289–95.

*Primary Examiner*—Majid A. Banankhah
*Attorney, Agent, or Firm*—William A. Kinnaman, Jr.

[57] ABSTRACT

A method and apparatus for controlling the assignment of units of work to workload enclaves in a client/server system in which units of work are organized into enclaves with the units of work in each enclave being managed as a single entity. Incoming work requests are queued for processing by one or more worker threads of one or more server processes. In response to the receipt of an incoming work request, a putwork() service of the operating system kernel defines an workload enclave for the work request and adds the work request to a queue of incoming work requests to enqueue the request. In response to a request from a worker thread for more work, a getwork() service of the operating system kernel removes a work request from the queue to dequeue the request and associates the worker thread with the enclave defined for the request. If a worker thread must create a new unit of work while processing a work request, it calls an appropriate service of the operating system kernel, which creates the new unit of work and associates the new process with the enclave of the worker thread. The worker thread is disassociated from the enclave upon completion of the work request.

13 Claims, 5 Drawing Sheets

METHOD AND APPARATUS FOR CONTROLLING THE ASSIGNMENT OF UNITS OF WORK TO A WORKLOAD ENCLAVE IN A CLIENT/SERVER SYSTEM

CROSS-REFERENCE TO RELATED APPLICATION(S)

This application is related to the following commonly owned, concurrently filed application(s), incorporated herein by reference:

J. D. Aman et al., "Method and Apparatus for Controlling the Number of Servers in a Client/Server System", Ser. No. 08/828,940.

D. F. Ault et al., "Method and Apparatus for Transferring File Descriptors in a Multiprocess, Multithreaded Client/Server System", Ser. No. 08/825,302.

BACKGROUND OF THE INVENTION

1. Field of the Invention

This invention relates a method and apparatus for controlling the assignment of units of work to a workload enclave in a client/server system and, more particularly, to a method and apparatus for associating multiple threads and processes created via a standard interface on behalf of a single user work request as a single "business unit of work" entity.

2. Description of the Related Art

Client/server systems are well known in the field of data processing. In a client/server system, a client process issues a request to a server process to perform a service for it. In response, the server transmits a reply to the client, notifying it of the results of the service.

There are many existing server applications which developers want to be able to execute on server systems of different capacities. These server applications need to scale with the size of the computer they are running on. The present invention addresses the problem of how to manage the workload resulting from thousands of concurrent requests to a server.

On UNIX-based systems, especially ones that are X/Open compliant, user work requests originates from many heterogeneous sources. Some of these include commands entered at an interactive terminal, client requests incoming to a server over a socket connection, or batch job submissions. In all of these cases, the resulting transaction or "business unit of work" may eventually be broken up into multiple dispatchable work units to complete the work request. For the purposes of this disclosure, a "business unit of work" is a single transaction that may consist of one or more dispatchable units of work. A dispatchable unit of work is a single thread of control within a given process. To create the dispatchable units of work that make up a "business unit of work", the following mechanisms are used on UNIX-based systems:

1. Create one or more new processes using fork(), vfork(), fork() and exec(), spawn(), popen(), system() or the equivalent to run one or more programs and/or scripts.
2. Create one or more new threads in the running process using pthread_create to run subroutines of the main thread routine.
3. Create any combination of new threads and processes using both the thread creation and process creation mechanisms.

In the field of this invention, where multiple dispatchable units of work (threads and/or processes) are created to complete a single user work request, there needs to be a new mechanism for these related dispatchable units of work to be tied together into one "business unit of work" for system performance and accounting purposes.

This problem has not been previously solved on a UNIX-based system using the UNIX-based work unit creation mechanisms that are available on these systems.

SUMMARY OF THE INVENTION

In accordance with the present invention, an incoming user work request consisting of multiple dispatchable units of work created using the system interfaces described herein is managed by the workload manager as a single workload manager enclave. Each dispatchable unit of work that is created on behalf of the work request is attributed to the workload manager enclave and is given its share of system resources based on the enclave's workload manager classification. The present invention provides the ability for the operating system to account for and manage all resources required of an incoming user work request. For a system that runs complex user transactions, the present invention provides a superior method for the system to manage and account for the requested work.

DESCRIPTION OF THE PREFERRED EMBODIMENTS

Some of the terminology used in this specification, while fairly standard in the art, is explained below for ready reference.

A file descriptor is a small integer used by a process to identify a file or similar object that has been opened by it for input/output (I/O). Certain file descriptors are generally reserved, such as 0 for standard input, 1 for standard output, and 2 for standard error. Thus, the first file opened by a process may be assigned a descriptor of 3, the second file is assigned a descriptor of 4, and so on. The file descriptor is an index into a file descriptor table that is maintained for a particular process and which contains pointers to other data structures (e.g., vnodes) containing file access information. (In the present application, as will be apparent, the term "file descriptor" is also used as a shorthand reference to the table entry itself, to which the index points.) When a process closes a file, the descriptor formerly assigned to that file becomes available for assignment to a subsequently opened file. File descriptors are unique to a process, so that a file that has been opened by several processes may be assigned a different descriptor for each process. File descriptors are well known in the art and are described further at page 28 of W. R. Stevens, *UNIX Network Programming*, 1990, incorporated herein by reference.

A socket is a programming construct at each end of a communications connection that allows a first process to communicate with a second process at the other end of the communications connection, usually on a remote machine. Each process communicates with the other process by interacting directly with the socket at its end of the communication connection. Processes open sockets in a manner analogous to opening files, receiving back a file descriptor (specifically, a socket descriptor) by which they identify a socket. Sockets are likewise well known in the art and are described at length at pages 258–341 of the above-identified work of W. R. Stevens, as well as at pages 292–293 of A. S. Tanenbaum, *Modern Operating Systems*, 1992, incorporated herein by reference.

Figure 1:
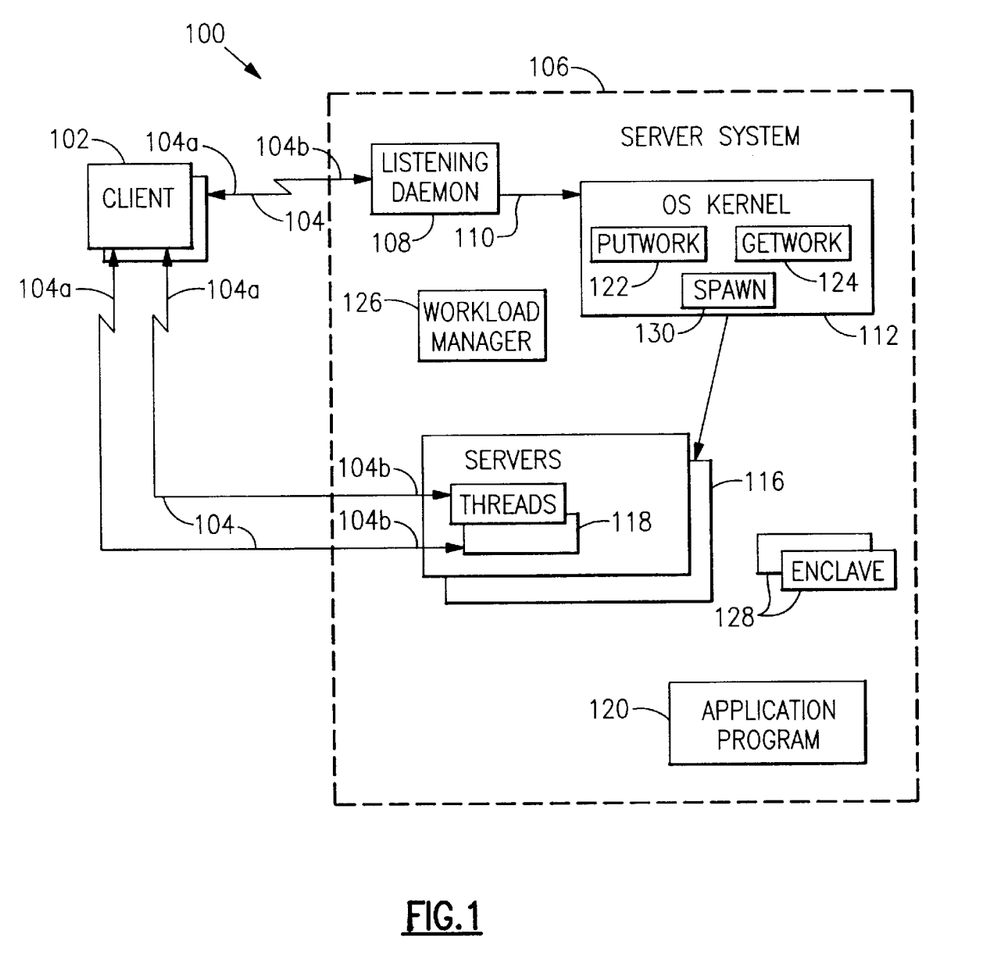
FIG. 1 is a schematic block diagram of a client/server system incorporating the present invention.

Referring to FIG. 1, an exemplary client/server system 100 incorporating the present invention includes one or more clients 102, each of which is connected to a server system 106 via a communications connection 104. Communications connection 104 may be managed by any suitable communications protocol such as TCP/IP. Server system 106 comprises one or more listening daemons 108, each of which is serviced by one or more server processes (or simply "servers") 116.

Communications connection 104 couples a particular client 102 to a particular server process in server system 106 (either a listening daemon 108 or a server process 116, as will be described) via respective sockets 104a and 104b at the client and server ends that the processes identify with socket descriptors. (In view of this one-to-one correspondence between a communications connection 104 and its sockets 104a–104b, the terms "communications connection" and "socket" are sometimes used interchangeably herein).

Listening daemon 108 distributes work to servers 116 through respective putwork() and getwork() services 122 and 124 provided by an operating system (OS) kernel 112. OS kernel 112 may comprise the kernel portion of the IBM® OS/390™ operating system, running on a server system 106 comprising an IBM System/390® (S/390®) server, although the invention is not limited to any particular hardware or software platform. OS kernel 112 creates additional servers 116 based on demand and installation policy. Each client request is eventually serviced by a thread 118 running in a server 116, via a communication connection 104 and server-end socket 104b that has been transferred from the listening daemon 108 to the thread 118 in a manner to be described. Any suitable means may be used to control the creation of multiple threads 118 in multiple server address spaces 116; the particular means used form no part of the present invention.

System 106 also contains a workload manager (WLM) 126, programming that is associated with OS kernel 112. Workload manager 126 works in conjunction with a system resource manager (not separately shown) to control the allocation of system resources to various service classes into which units of work are classified in accordance with how the service classes are meeting predefined goals. The operation of workload manager 126, while forming no part of the present invention, is described in more detail in U.S. Pat. No. 5,473,773 to J. D. Aman et al., entitled "Apparatus and Method for Managing a Data Processing System Workload According to Two or More Distinct Processing Goals"; the copending application of C. K. Eilert et al., Ser. No. 08/383,168, filed Feb. 3, 1995, entitled "Apparatus and Method for Managing a Distributed Data Processing System Workload According to a Plurality of Distinct Processing Goal Types"; and the concurrently filed application of J. D. Aman et al., Ser. No. 08/222,752, identified in the above cross-reference to related applications, all of which are incorporated herein by reference.

The present invention relates to the procedure used to manage and account for a client work request from its beginning in the listening daemon 108 to its final completion on the thread 118 running in a server 116. It does not relate to the procedure for obtaining work from an external source or the distribution of the work within a given system.

Figure 2:
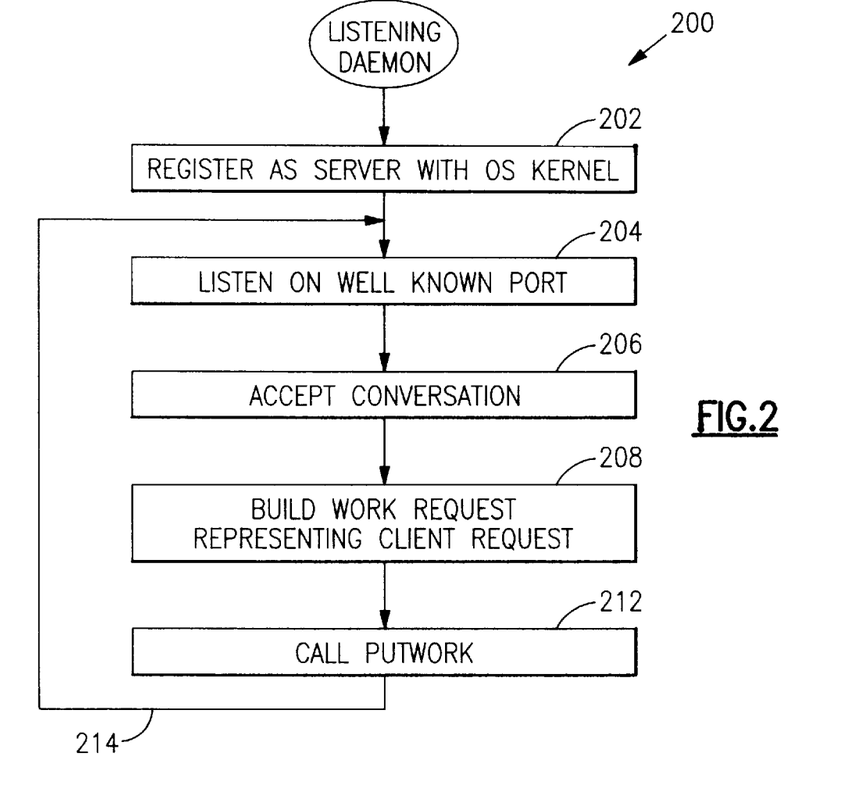
FIG. 2 shows the processing done in the listening daemon.

FIG. 2 shows the procedure 200 followed by listening daemon 108. Listening daemon 108 first registers as a server with the OS kernel 112 (step 202). When a similar step is taken by the servers 116, it allows the OS kernel 112 to accept work from the listening daemon 108 and dispatch the work on the appropriate server 116.

The listening daemon 108 then enters an endless loop where it waits for input on a communications port 104 (step 204). When the listening daemon 108 accepts a conversation (step 206), it receives a socket descriptor identifying the socket 104b which is used for all future communications with the client 102. In a UNIX®-compliant system such as OS/390, steps 204 and 206 are accomplished via listen() and accept() system calls to the OS kernel 112 in a manner well known in the art.

Listening daemon 108 then builds a set of putwork() parameters 300 (FIG. 3) representing the client request (step 208). The work request consists of any data that the listening daemon 108 needs to pass to the server 116 as well as any file descriptors (including socket descriptors) that need to be transferred to the server. Frequently, the only file descriptor that needs to be transferred to the server 116 is the one that represents the socket 104b.

Listening daemon 108 then calls the putwork() service 122 of the OS kernel 112, passing to it the putwork() parameters 300 (FIG. 3) representing the work request (step 212). The processing steps performed by the putwork() service 122 are shown in FIGS. 4A and 4B and are described below.

The parameter processing performed in steps 208 and 212 is similar in some respects to that done in a standard UNIX function called spawn(), a version of which modified in accordance with the present invention is described below. The spawn() function allows a first process (such as a listening daemon) to create a new process to which is passed data and replicate file descriptors for the new process. However, the spawn() function builds a new process, which entails significant overhead for the OS kernel 112.

After passing the work request to the putwork() service 122 of the OS kernel 112, the listening daemon 108 loops back (step 214) to wait for another request from a client 102.

Figure 3:
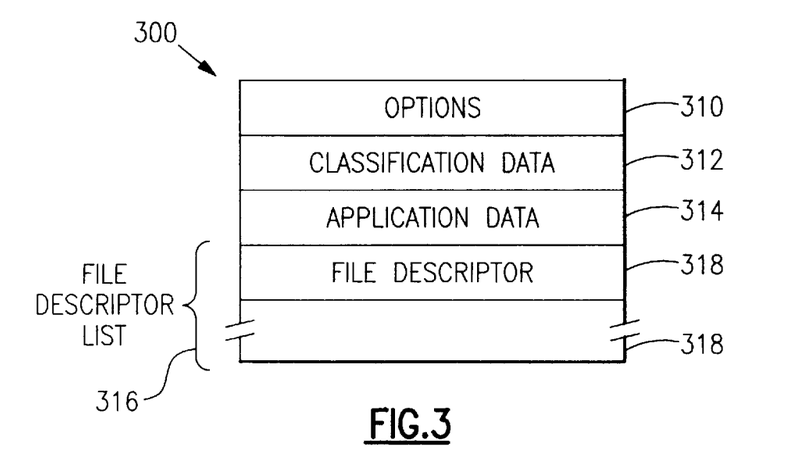
FIG. 3 describes the information which is passed by the listening daemon on the putwork() kernel call.
Figure 4A:
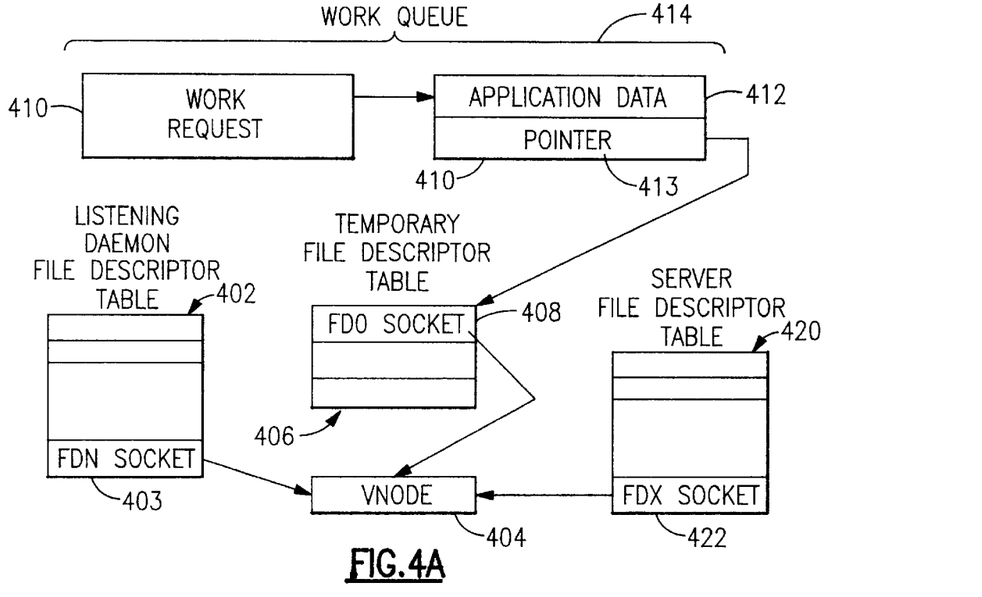
FIG. 4A shows the file descriptor tables and work queues that are used by the present invention.
Figure 4B:
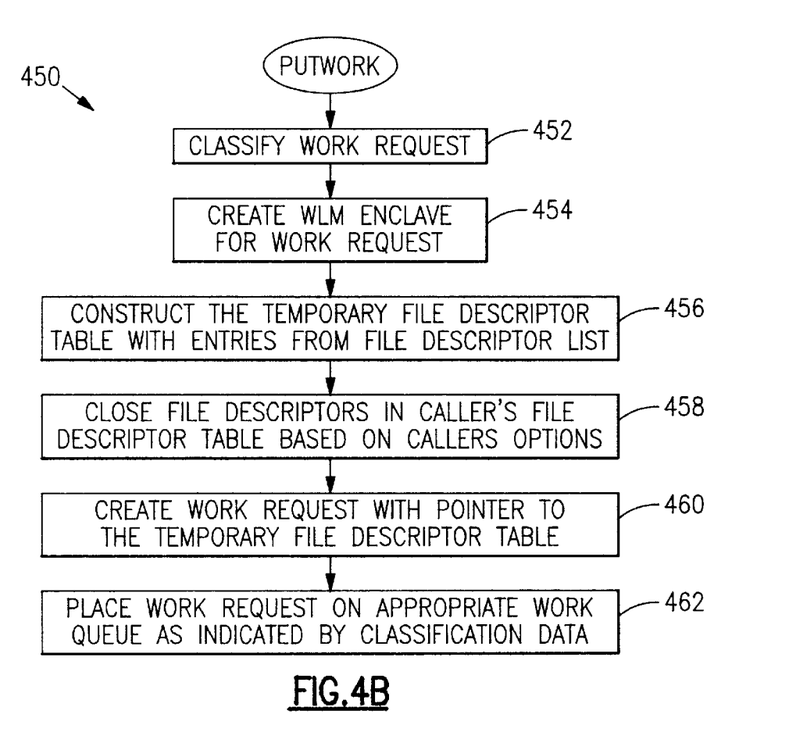
FIG. 4B shows the steps performed by the putwork() service of the present invention.

FIG. 3 shows the set of putwork() parameters 300 that a listening daemon 108 assembles to represent a client's work request. Options 310 allow the listening daemon 108 to request that the putwork() service 122 close the file descriptor after it has been transferred to the server 116. This avoids the overhead of requiring the listening daemon 108 to make a separate call to close the socket 104b. The next parameter consists of classification data 312, used by the OS kernel 112 to identify the correct server 116 to handle the work. Application data 314 allows the listening daemon 108 to pass any parameters it wants to the thread 118 that executes the client request in a server 116.

File descriptor list 316 contains one or more file descriptors 318 (i.e., indices into a file descriptor table) that the listening daemon 108 wants to transfer to the server 116. As noted above, frequently only a single file descriptor 318, representing the socket 104b that provides the communications connection 104 to the client 102, is passed.

Referring to FIG. 4A, in a manner that is well known in the art, each process on server system 106, including listening daemon 108 and server processes 116, has a file descriptor (FD) table associated with it that is used to keep track of all open files or other objects such as sockets 104b representing communications connections 104. Thus, listening daemon 108 has a file descriptor (FD) table 402.

When a socket 104b is created, the OS kernel 112 builds a virtual node (vnode) 404 to represent the socket. The OS kernel 112 then scans the file descriptor table of the process for which it is creating the socket 104b, in this case file descriptor table 402, for an available slot. Assuming slot N is the first available slot in file descriptor table 402, OS kernel 112 stores a pointer 403 in slot N that points to vnode 404. (This pointer 403, and not the index N into the table 402, is the thing that is transferred to a server process 116.) From the point of view of the listening daemon 108, the pointer 403 indexed by N (where N is the file descriptor 318 returned to the process) represents socket 104b and thus its connection 104 to the client 102. The real information needed to perform communication with the client 102 is stored in the vnode 404.

In a similar manner, each server process 116 in the operating system has its own file descriptor table 420. Threads 118 within a server process 116 share a common file descriptor table 420, since a file or other object that is open to one thread in a process is open to all.

FIG. 4B shows the procedure 450 performed by the putwork() service 122 when processing a putwork() request (step 212) from a listening daemon 108.

The putwork() service 122 first classifies the work request based on the classification data 312 supplied by the listening daemon 108 (step 452). After classifying the work request, the putwork service 122 creates a workload manager (WLM) enclave 128 to represent the work request (step 454). As described in *MVS Programming: Workload Management Services,* IBM publication GC28-1773-00, 1996, incorporated herein by reference, at pages 39–44, an enclave 128 defines a set of resource users (such as threads or processes) that are managed as a single entity for the purpose of resource allocation. This establishes the business unit of work relationship between the work request and the WLM enclave 128.

Enclaves are also discussed in the commonly assigned copending application of S. J. Greenspan et al. entitled "Separating Work Unit Priority and Accountability from Address Spaces", Ser. No. 08/768,038, filed Dec. 17, 1996, incorporated herein by reference.

The particular data structures used to associate the units of work described herein with a particular enclave and manner in which workload manager 126 and related system elements allocate resources to units of work that are associated with a particular enclave 128 as a single "business unit of work" form no part of the present invention. Any of various data structures or allocation schemes could be used, such as the ones described in the references cited above.

Next, the putwork() service 122 makes a copy of the user-supplied parameters and file descriptors so they can be made available to a worker thread 118 when it obtains the work request. Thus, referring also to FIG. 4A, the putwork() service 122 constructs a temporary file descriptor table 406 (step 456). Each file descriptor 318 in the caller's file descriptor list 316 (FIG. 3) has its corresponding entry 403 in file descriptor table 402 replicated in this temporary file descriptor table 406 so that it has a corresponding entry 408 in the temporary file descriptor table.

After the file descriptors 408 have been captured in the temporary file descriptor table 406, the descriptors 403 in the listening daemon table 402 are closed (i.e., deleted from table 402) if the caller has specified this in its options 310 (step 458).

After all file descriptors 403 have been processed and replicated in the temporary file descriptor table 406, the putwork() service 122 creates a work request 410 which contains application data 412 (=application data 314 from the parameter list 300) and a pointer 413 to the temporary file descriptor table 406 for that work request (step 460). This work request 410 is then placed on the appropriate work queue 414 as indicated by the classification data 312 (step 462).

When a getwork() request later occurs from a thread 118 running in a server 116, the getwork() service 124 performs another set of file descriptor transfers. First, the getwork() service 124 scans the file descriptor table 420 of the server 116. For each entry 408 in the temporary file descriptor table 406, a new entry 422 is replicated in the server 116's file descriptor table 420. When this step is complete, the server 116, and hence its threads 118, has access to the same files or communication links (i.e., sockets) that the listening daemon 108 had.

Figure 5A:
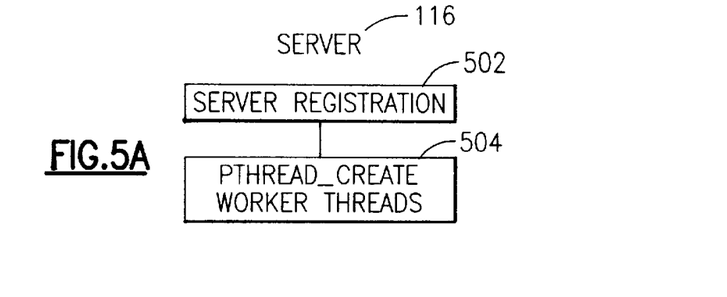
FIG. 5A shows the processing steps performed by each server process.
Figure 5B:
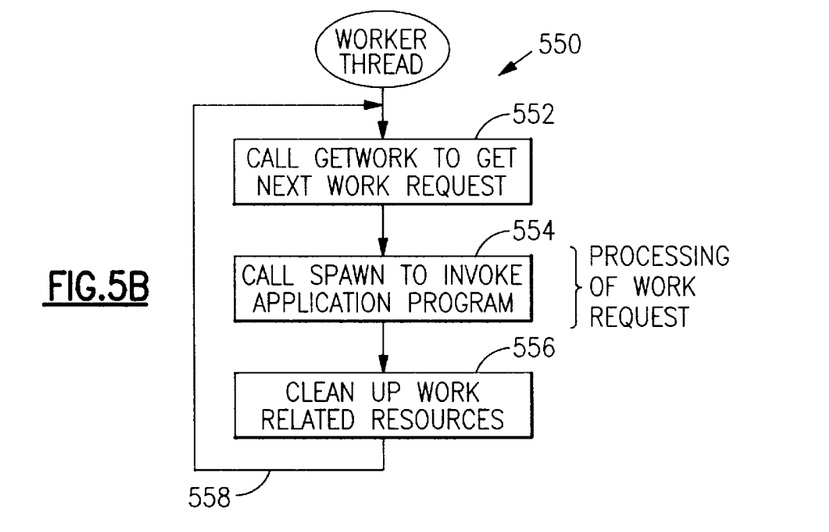
FIG. 5B shows the processing steps performed by each worker thread created by a server process.

FIGS. 5A–5B show the processing that is done by a server 116 and its worker threads 118. Referring to FIG. 5A, when a server 116 is started, it calls a server registration service in a manner similar to that of the listening daemon 108 (step 502). This provides the OS kernel 112 with the information needed to bind the work queue 414 to the listening daemon 108 that adds elements and the server 116 that removes them. The server 116 then issues a pthread_create() system call to the OS kernel 112 to create multiple worker threads 118 (step 504).

Figure 6:
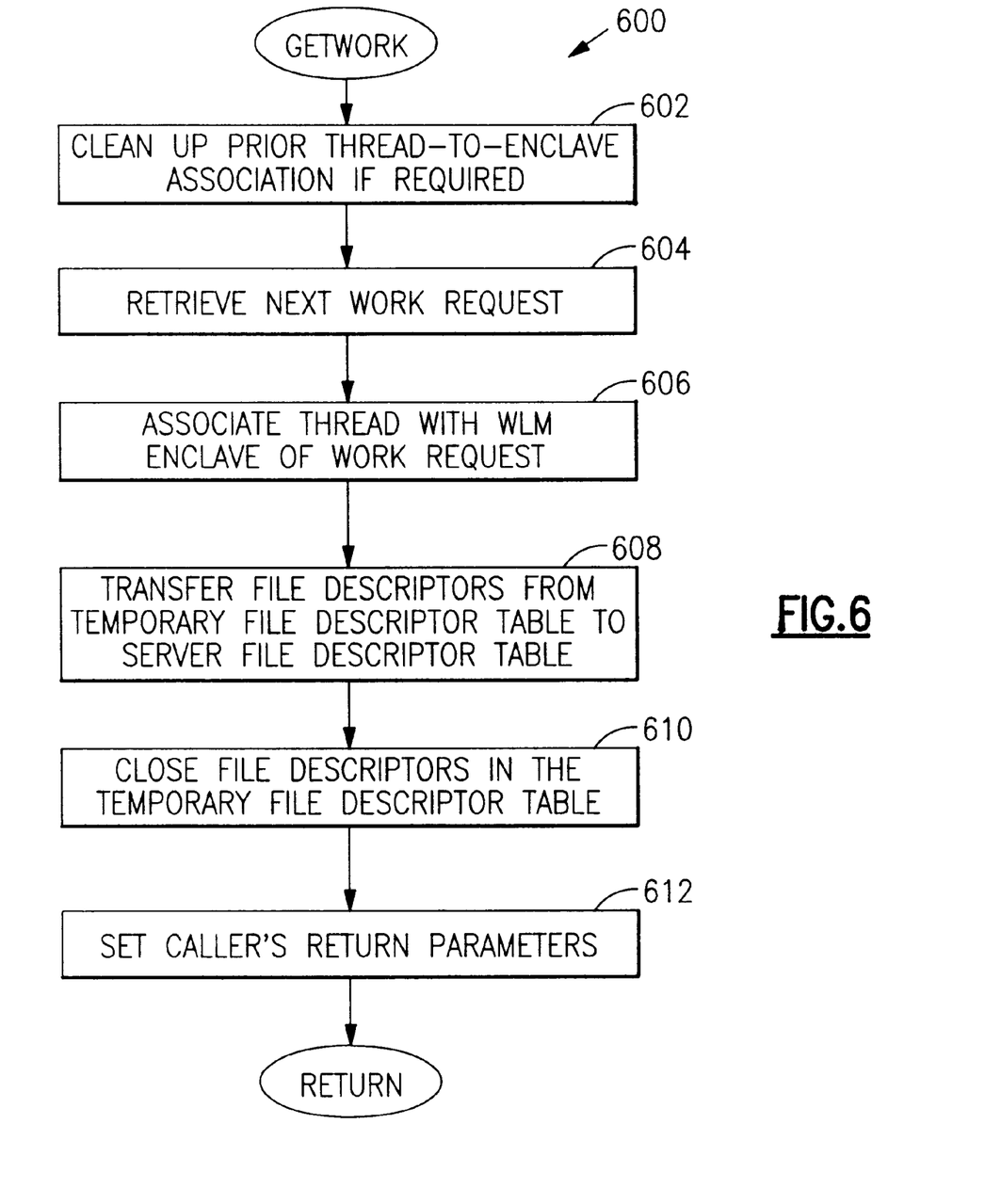
FIG. 6 shows the steps performed by the getwork() service of the present invention.

FIG. 5B shows the procedure 550 followed by each worker thread 118 created by a server process 116. Referring to FIG. 5B, each worker thread 118 upon being created calls the getwork() service 124 to request the next piece of work 410 from a client 102 (step 552). The operation of the getwork() service 124 is shown in FIG. 6 and explained further below. The thread 118 receives one or more file descriptors (i.e., pointers to a vnode) 422 from the getwork() service 124, which the thread uses to process the work request 410 and communicate back to the client 102.

In this particular example, after retrieving a work request 410 the worker thread 118 determines that the work request requires the invocation of a separate application program 120 (FIG. 1). To invoke the application program 120, thread 118 calls a spawn() service 130 of the OS kernel 112, the operation of which is described below (step 554).

When a work request 410 is completed, the thread 118 cleans up any required resources related to the processed work request; this includes closing any file descriptors 422 related to the work request 410 by deleting them from the descriptor table 420 (step 556). The thread 118 then loops back (step 558) to step 552 to perform the next getwork() call.

FIG. 6 shows the procedure 600 performed by the getwork() service 124 of OS kernel 112 (FIG. 1) upon being called by a worker thread 118 (step 552 of FIG. 5B).

When called again by a worker thread 118 at the completion of a previously obtained work request 410, the getwork() service 124 first attempts to clean up the association between the old WLM enclave 123 and the calling worker thread 118 (step 602). Since the previous work request 410 has been completely processed by the worker thread 118, the WLM enclave 128 is no longer relevant. Therefore, as part of the cleanup processing, old the WLM enclave 128 is deleted, which indicates to the system 106 the end of the previous work request 410.

The getwork() service 124 then attempts to retrieve the next work request 410 from the work queue 414 (step 604). If no work is available, the worker thread 118 is suspended in a manner well known in the art until more work arrives.

Next, the getwork() service 124 associates the dispatchable work unit comprising the calling worker thread 118 with the new WLM enclave 128 created for the work request 410 to establish the business unit of work relationship between the calling worker thread and that new WLM enclave 128 (step 606).

Upon retrieving the next work request 410, and as described above with respect to FIGS. 4A–4B, the getwork() service 124 transfers file descriptors 408 from the temporary file descriptor table 406 to the file descriptor table 420 of the server 116 (step 608).

After the file descriptor transfer is complete, the file descriptors 408 in the temporary file descriptor table 406 are closed and the temporary file descriptor table 406 is freed (step 610).

Finally, the getwork() service 124 informs the calling thread 118 (by setting appropriate return parameters) which file descriptors 422 are available for it to use (step 612).

Figure 7:
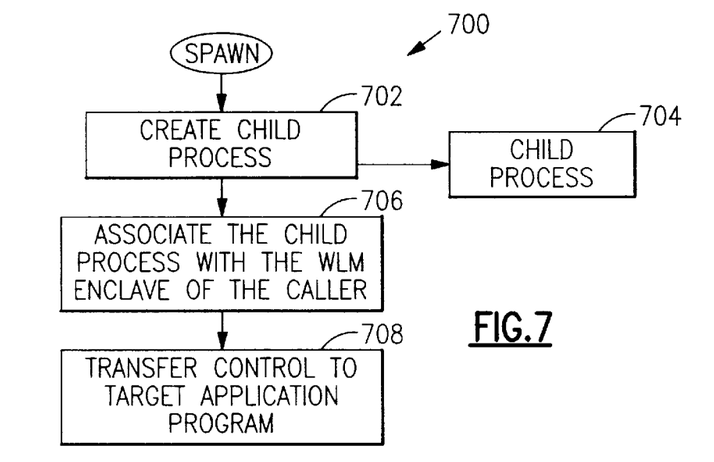
FIG. 7 shows the steps performed by the spawn() service of the present invention.

FIG. 7 shows the procedure 700 followed by the spawn() service 130. The spawn() service 130 first creates a new child process 704 constituting an instance of the application program 120 (step 702). The child process 704 inherits many of the parent's process attributes as part of the child creation processing.

After creating the child process 704, the spawn() service 130 associates the child process with the WLM enclave 128 of the worker thread 118 that called the spawn() service (step 706). This establishes the business unit of work relationship between the new child process 704 and the work request 410.

Finally, the spawn() service 130 transfers control to the target application program (step 708). When the target application program terminates, its association with the WLM enclave 128 is broken.

In FIG. 7, a kernel spawn() service was used to create a new child process. However, the same associating with the enclave of the caller may be performed for other system services such as the UNIX services fork(), vfork(), exec(), popen() , system() and pthread_create(). Whenever a thread creates a new dispatchable unit of work to complete the processing of work request, the newly created dispatchable unit of work is associated with the workload enclave of the incoming work request to allow the operating system to manage and account for the entire work request. The present invention thus provides a mechanism for a server operating system to manage and account for all resources consumed by a user work request.

The invention is preferably implemented as software (i.e., a machine-readable program of instructions tangibly embodied on a program storage devices) executing on one or more hardware machines. While a particular embodiment has been shown and described, various modifications will be apparent to those skilled in the art. Thus, while the description has been with reference to a UNIX-compliant system, the present invention is not limited to such systems and may be used in any system in which similar constructs are used.

What is claimed is:

1. In a client/server system in which incoming work requests are queued for processing by one or more worker threads of one or more server processes and in which units of work are organized into enclaves with the units of work in each enclave being managed as a single entity by a workload manager, each of said enclaves having a workload manager classification for determining a share of system resources to be given to units of work in that enclave, a method of controlling the assignment of said worker threads to said enclaves, comprising the steps of:

in response to the receipt of an incoming work request, defining an enclave for said work, request and adding said work request to a queue of incoming work requests to enqueue said request; and in response to a request from a worker thread for more work, removing a work request from said queue to dequeue said request and associating slid worker thread with the enclave defined for said request; and providing said worker thread while processing said request from said queue with a share of system resources based on the workload manager classification of said enclave.

2. The method of claim 1 in which said client/server system has a plurality of server processes, each of which has one or more worker threads associated therewith.

3. The method of claim 1 in which each of said server processes has a plurality of worker threads associated therewith.

4. The method of claim 1 in which said enqueuing step is performed by an operating system kernel in response to a system call.

5. The method of claim 1 in which said dequeuring step is performed by an operating system kernel in response to a system call from said worker thread.

6. The method of claim 1 in which said worker thread creates a new unit of work, said method comprising the further step of associating said new unit of work with the enclave associated with said worker thread.

7. The method of claim 1, including the further step of:

disassociating said worker thread from said enclave upon completion of said work request.

8. The method of claim 7 in which said enclave is deleted upon completion of said work request.

9. The method of claim 1 in which said enclave is newly created upon receipt of said work request.

10. A program storage device readable by a machine, tangibly embodying a program of instructions executable by the machine to perform the method steps of claim 4.

11. In a client/server system in which incoming work requests are queued for processing by one or more worker threads of one or more server processes and in which units of work are organized into enclaves with the units of work in each enclave being managed as a single entity by a workload manager, each of said enclaves having a workload manager classification for determining a share of system resources to be given to units of work in that enclave, apparatus for controlling the assignment of said worker threads to said enclaves, comprising:

enqueuing means responsive to the receipt of an incoming work request for defining an enclave for said work request and adding said work request to a queue of incoming work requests to enqueue said request; and dequeuing means responsive to a request from a worker thread for more work for removing a work request from said queue to dequeue said request and associating said worker thread with the enclave defined for said request; and providing said worker thread while processing said request from said queue with a share of system resources based on the workload manager classification of said enclave.

12. The apparatus of claim 11 in which said worker thread creates a new unit of work, said apparatus further comprising:

means for associating said new unit of work with the enclave associated with said worker thread.

13. The method of claim 12, further comprising:

means for disassociating said worker thread from said enclave upon completion of said work request.

* * * * *

UNITED STATES PATENT AND TRADEMARK OFFICE
CERTIFICATE OF CORRECTION

PATENT NO. : 6,085,217
DATED : July 4, 2000
INVENTOR(S) : Ault et al.

It is certified that error appears in the above-identified patent and that said Letters Patent are hereby corrected as shown below:

Column 1, lines 11 and 12, "Ser. No. 08/828,940." should be --Ser. No. 08/828,440.--.

Signed and Sealed this

Tenth Day of April, 2001

Attest:

NICHOLAS P. GODICI

Attesting Officer        Acting Director of the United States Patent and Trademark Office